(12) United States Patent
Beardsmore et al.

(10) Patent No.: US 8,615,580 B2
(45) Date of Patent: Dec. 24, 2013

(54) MESSAGE PUBLICATION FEEDBACK IN A PUBLISH/SUBSCRIBE MESSAGING ENVIRONMENT

(75) Inventors: Anthony P. Beardsmore, Winchester (GB); Jonathan Levell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 13/031,224

(22) Filed: Feb. 20, 2011

(65) Prior Publication Data

US 2012/0215856 A1 Aug. 23, 2012

(51) Int. Cl.
*G06F 15/16* (2006.01)
*G06F 15/173* (2006.01)

(52) U.S. Cl.
USPC .......................................... 709/224; 709/206

(58) Field of Classification Search
USPC .................................. 709/206, 224
See application file for complete search history.

(56) References Cited

U.S. PATENT DOCUMENTS

| | | | |
|---|---|---|---|
| 6,158,007 A | 12/2000 | Moreh et al. | |
| 6,272,386 B1 | 8/2001 | McLaughlin et al. | |
| 6,421,570 B1 | 7/2002 | McLaughlin et al. | |
| 6,684,120 B1 | 1/2004 | Oku et al. | |
| 7,376,092 B2 | 5/2008 | Yajnik et al. | |
| 7,707,255 B2 * | 4/2010 | Satterfield et al. | 709/206 |
| 7,792,908 B2 * | 9/2010 | Charters et al. | 709/206 |
| 7,865,550 B2 | 1/2011 | Lobban et al. | |
| 8,429,238 B2 * | 4/2013 | Lobban et al. | 709/206 |
| 2001/0047270 A1 * | 11/2001 | Gusick et al. | 705/1 |
| 2003/0115317 A1 | 6/2003 | Hickson et al. | |
| 2004/0250283 A1 * | 12/2004 | Duigenan et al. | 725/60 |
| 2005/0021622 A1 | 1/2005 | Cullen | |
| 2006/0136256 A1 | 6/2006 | Roots et al. | |
| 2007/0245018 A1 | 10/2007 | Bhola et al. | |
| 2008/0133337 A1 * | 6/2008 | Fletcher et al. | 705/10 |
| 2008/0168122 A1 | 7/2008 | Fletcher et al. | |
| 2008/0183828 A1 | 7/2008 | Sehgal et al. | |
| 2008/0244696 A1 | 10/2008 | Bhola et al. | |
| 2008/0294714 A1 | 11/2008 | Garza et al. | |
| 2009/0187635 A1 | 7/2009 | Lobban et al. | |
| 2009/0290503 A1 | 11/2009 | Preston et al. | |

(Continued)

OTHER PUBLICATIONS

Zhao, et al., "Dynamic Access Control in a Content-based Publish/Subscribe System with Delivery Guarantees". 26th IEEE International Conference on Distributed Computing Systems (ICDCS'06), 2006. 8 pages.

(Continued)

*Primary Examiner* — Larry Donaghue
(74) *Attorney, Agent, or Firm* — Marcia L. Doubet

(57) ABSTRACT

Control and/or feedback are provided for message publication in a publish/subscribe messaging environment. A number of different aspects are disclosed, and an embodiment may include one or more of these aspects. In each aspect, each subscribing application has an associated importance level for a subscription, and this importance level may vary among subscriptions for different message topics. Each published message has an associated topic. In some aspects, each published message also has associated criteria, where the criteria are specified with regard to message classification. In preferred embodiments, the message classification comprises importance criteria specifying requirements for importance level of subscribers registered for the topic of that message. Feedback can be provided regarding whether a message publication meets the importance criteria. Control over message publication can be based on whether a message publication meets the importance criteria.

18 Claims, 9 Drawing Sheets

(56) References Cited

U.S. PATENT DOCUMENTS

| | | |
|---|---|---|
| 2011/0145593 A1 | 6/2011 | Auradkar et al. |
| 2012/0215872 A1 | 8/2012 | Beardsmore et al. |
| 2012/0215873 A1 | 8/2012 | Beardsmore et al. |
| 2012/0290685 A1* | 11/2012 | Garza et al. .................. 709/217 |

OTHER PUBLICATIONS

Rajkumar, R., et al., "High availability in the real-time publisher/subscriber inter-process communication model". Proceedings of the IEEE Real-Time Systems Symposium, Dec. 1996. pp. 136-141.

Li, G., et al., "Composite Subscriptions in Content-Based Publish/Subscribe Systems". 6th International Middleware Conference, Grenoble, France. Nov. 2005. 21 pages.

Zhang, Y., "Composite Subscriptions in Content-Based Publish/Subscribe Systems". Feb. 2007. 9 pages.

Arianfar, Somaya, "Optimizing Publish/Subscribe Systems with Congestion Handling". Master's Thesis, Helsinki University of Technology. Jun. 2008. 72 pages.

Anthony P. Beardsmore, et al., U.S. Appl. No. 13/031,226, filed Feb. 21, 2011, Office Action, Jun. 19, 2013, 20 pages.

* cited by examiner

MESSAGE PUBLICATION FEEDBACK IN A PUBLISH/SUBSCRIBE MESSAGING ENVIRONMENT

CROSS-REFERENCE TO RELATED APPLICATIONS

The present invention is related to the following commonly-assigned and co-pending applications, which were filed on even date herewith and which are incorporated herein by reference: U.S. patent application Ser. No. 13/031,225, titled "CRITERIA-BASED MESSAGE PUBLICATION CONTROL AND FEEDBACK IN A PUBLISH/SUBSCRIBE MESSAGING ENVIRONMENT"and U.S. patent application Ser. No. 13/031,226, titled "FAILURE-CONTROLLED MESSAGE PUBLICATION AND FEEDBACK IN A PUBLISH/SUBSCRIBE MESSAGING ENVIRONMENT".

BACKGROUND

The present invention relates to computing systems, and deals more particularly with message publication control and feedback in a publish/subscribe, or "pub/sub", messaging environment.

Publish/subscribe messaging systems are known in the art for publishing messages in computing environments, and provide an effective way of disseminating information to multiple users. Pub/sub messaging enable messages to be published to a widespread, dynamically changing and potentially large audience in a timely manner. Typically, the message publishers are not concerned with where their messages are sent, and the subscribers are not concerned with where the messages originate. Instead, an intermediary commonly referred to as a message broker is typically responsible for receiving messages from publishers, consulting previously-registered subscription information associated with the subscribers to determine which subscribers should receive the published messages, and then forwarding the messages to the appropriate subscribers according to the registered subscriptions.

BRIEF SUMMARY

The present invention is directed to message publication feedback in a publish/subscribe messaging environment. In one aspect, this comprises: receiving, at a message broker, a message published by a message publisher, the message having associated therewith a topic; selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message; sending the published message from the message broker to each of the at least one selected subscriber; and sending, from the message broker to the message publisher, feedback regarding the sending of the published message.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Figure 1:
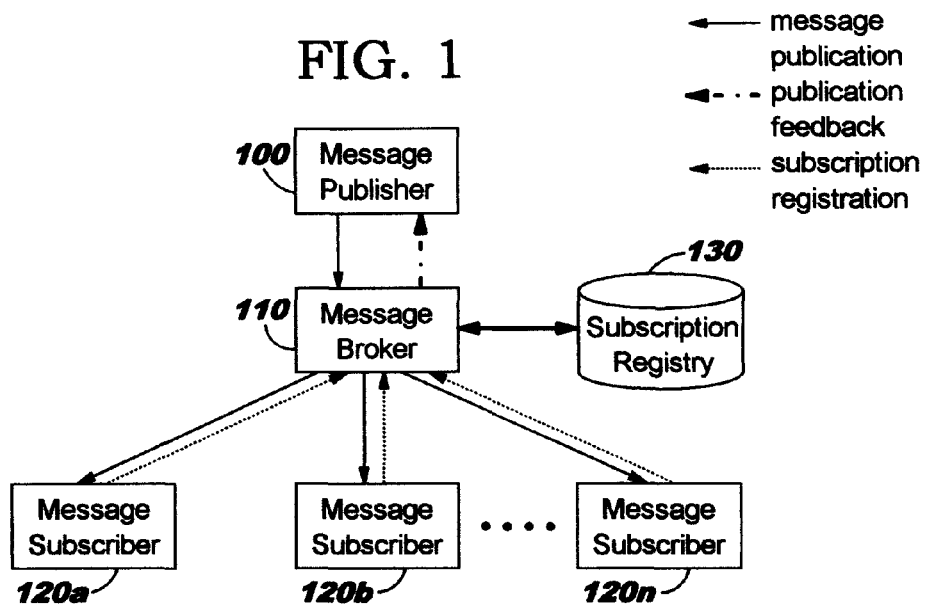
FIG. 1 illustrates components which may be used with an embodiment of the present invention.

The present invention is directed to control and/or feedback for message publication in a pub/sub messaging environment. A number of different aspects are disclosed. An embodiment may include one or more of these aspects. In each aspect, each subscribing application (referred to herein equivalently as a "subscriber" or "message subscriber") has associated classification information for a subscription, and this classification information may vary among subscriptions for different message topics. Each published message has an associated topic, which may be specified as a string value. In some aspects, each published message also has associated criteria, where the criteria are specified with regard to message classification. In preferred embodiments, the subscriber classification information in a subscription comprises an importance level of the subscriber with regard to the topic of the subscription, and the subscriber classification information is therefore discussed herein primarily with reference to importance levels. Also in preferred embodiments, the message classification in the associated criteria for a published message comprises importance level of subscribers registered for the topic of that message, and thus the term "importance criteria" is used herein when discussing such criteria.

Scenarios exist where it is important for the application publishing a message (referred to equivalently herein as a "publisher" or "message publisher") to know that at least some particular subset of subscribers has received a published message. Some messaging engines support this concept to a degree. The IBM® WebSphere® Message Queueing system (hereinafter, "WebSphere MQ"), for example, allows a publisher to receive, on request, a warning if no subscriber receives a published message. ("IBM" and "WebSphere" are registered trademarks of International Business Machines Corporation in the United States, other countries, or both.) Websphere MQ also allows designating parts of the topic space (i.e., particular topic strings or portions thereof) such that publishers are notified that a message publication failed if no subscriber receives a message published to that topic space. There is a need for more flexibility than what is available with existing support, however, as pub/sub systems known to the inventors do not provide message publication control and feedback as disclosed herein.

Suppose, for example, that a message publisher publishes messages using a topic "/orders/widgets", and that it is necessary for these messages to be received by at least 3 subscribers that each represent a different warehouse. Existing support in WebSphere MQ enables notifying the publisher if there are no subscribers registered for the topic—or alternatively, if there are no subscribers registered for a portion of the topic space such as "/orders"—but does not provide control for delivering the message to a particular number of subscribers and does not provide feedback regarding whether the message was delivered to the required number of subscribers.

As another example, suppose a published message needs to be received by both the audit department and the accounting department, and if both of these departments are not registered subscribers of the message, then neither department should receive it. No pub/sub systems are known to the inventors that provide this level of control over the publishing of a message.

According to certain aspects of the present invention, a publisher is able to control the publishing of messages based on the registered subscribers and their importance levels (or more generally, their subscriber classification information), where this subscriber information may be determined dynamically upon publication of the message by the publisher. In other aspects, a publisher receives feedback about the publication of messages to the registered subscribers. These aspects may be combined, providing both control and feedback, as will be discussed in more detail herein.

Suppose, by way of example, that a message publisher publishes a message having a particular topic and also having associated importance criteria indicating that the message publication requires at least 2 subscribers having an importance level of less than or equal to 5 (i.e., <=5). In the examples presented herein, importance levels are represented as integers between 0 and 9, where 9 is the highest and 0 is the lowest. Further suppose that 1 subscriber with an importance level of 5 has registered for this topic, and that 6 subscribers with an importance level of 3 have also registered for this topic. Because there are 7 subscribers meeting the "importance level<=5" requirement in this example, the message can be published to all 7 subscribers and the publisher can be informed that the publication was successful. In some aspects, the publisher may be informed of the actual number of matching subscribers. On the other hand, if the importance criteria specified that at least 2 subscribers having an importance level>=5 were required, then the criteria are not met because only 1 subscriber meets the "importance level>=5" requirement. Some aspects of the present invention provide for publishing the message to the matching subscriber and notifying the publisher that the criteria were not met, while other aspects will prevent publishing the message to any of the subscribers and will notify the publisher that publication of the message failed. Differences in message publication control and feedback among various aspects of the present invention are discussed in more detail below.

Components in one embodiment of a system that provides message publication control and feedback, as disclosed herein, will now be described with reference to FIG. 1.

Components shown in FIG. 1 comprise a message publisher 100; a message broker 110; several message subscribers 120a, 120b, . . . 120n; and a subscription registry 130. One or more of the components shown in FIG. 1 may be included in a messaging engine in which an embodiment of the present invention is implemented. These components will now be described in more detail.

Message publisher 100 publishes messages to message broker 110. Each published message has an associated topic and, in some aspects, associated criteria for publishing the message to subscribers. In preferred embodiments, the criteria are expressed with regard to message importance values. Each subscriber 120a, 120b, . . . 120n registers one or more subscriptions with message broker 110. Each subscription specifies a topic and an importance value. Message broker 110 maintains these subscriptions in subscription registry 130, which may be a database or other persistent store. Upon receiving a message from publisher 100, message broker 110 consults the subscription registry 130 when determining whether to send the message to subscribers 120a, 120b, . . . 120n. (Although a single publisher 100 is depicted in FIG. 1, it will be understood that this is by way of illustration only, and an actual implementation of the present invention may support a number of concurrently-active message publishers.)

Importance criteria for a particular message may be set by the message publisher. Alternatively, the criteria may be configured in other ways without deviating from the scope of the present invention, including through an administrative interface. When importance criteria are set by the message publisher, they may be distributed with the published message. Alternatively, the importance criteria may be stored in a repository in association with the published message (e.g., whereby the published message is usable as an index for retrieving the importance criteria). This latter approach is preferably also used when the importance criteria are configured by an administrator or other technique.

Importance levels may be specified in binary form—that is, signifying the importance level as "important" or "not important". Alternatively, more fine-grained support may be provided through use of additional importance levels. By way of illustration but not of limitation, discussions herein refer to an embodiment where importance levels are provided as integer values 0 though 9, where 9 is the highest or "most important" level and 0 is the lowest or "least important" level, as noted earlier.

In one approach, importance levels for each individual subscriber are set by a systems administrator. Importance levels may be set in other ways without deviating from the scope of the present invention. In some aspects, importance levels may be used to control the order in which subscribers will receive published messages, whereby subscribers that registered higher importance levels on that topic receive messages before subscribers that registered lower importance levels.

According to an embodiment of the present invention, a particular subscriber may subscribe to different topics using different importance levels. A subscriber 120a might register for a topic "orders/widgets" with importance level 4, for example, while registering for a topic "orders/gadgets" with importance level 6. At the same time, subscriber 120b might register for the topic "orders/widgets" with importance level 1, while not registering at all for the topic "orders/gadgets". In another approach, subscriber 120n might register for a portion of the topic space with importance level 5 by specifying this importance level for the topic "orders/"—which has the effect, in this example, of registering for both of the topics "orders/widgets" and "orders/gadgets" with importance level 5.

Notably, importance levels may be set for individual subscribers and topics in a way that causes the semantics in importance criteria associated with particular publishing scenarios to be carried out. With reference to the scenario discussed earlier where published messages need to be published to at least 3 warehouses, for example, the importance level assigned to the warehouse subscribers therefore needs to be aligned with the importance level(s) in the importance criteria that will be associated with these published messages.

Figure 2:
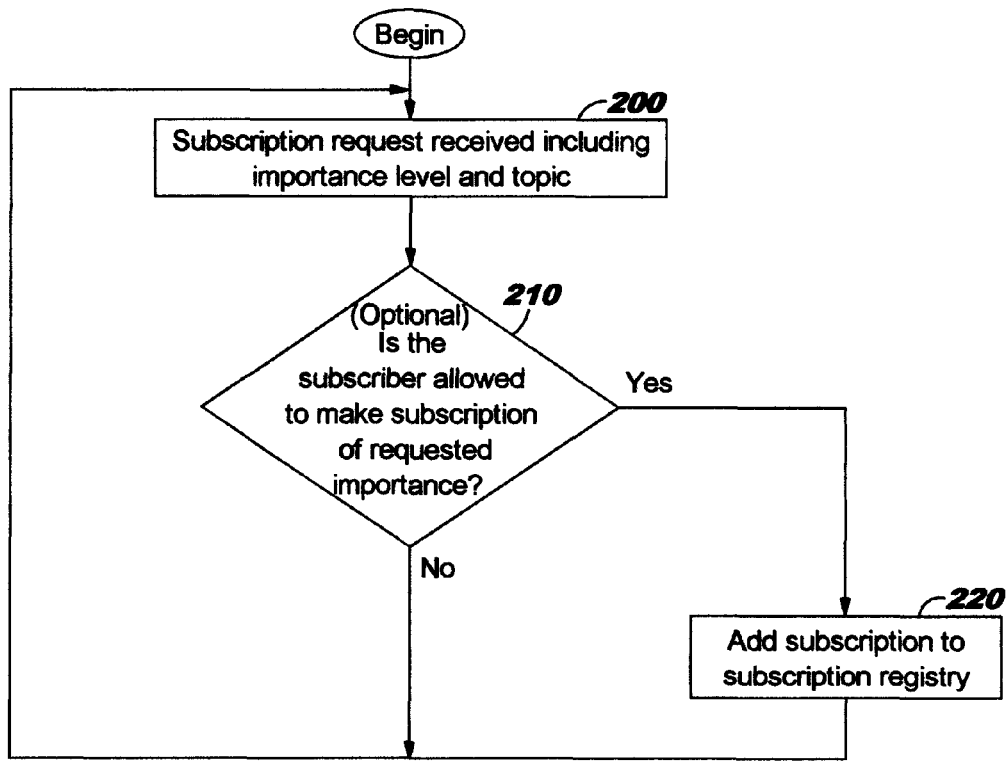
FIGS. 2-7 provide flowcharts depicting logic which may be used when implementing one or more embodiments of the present invention.
Figure 3:
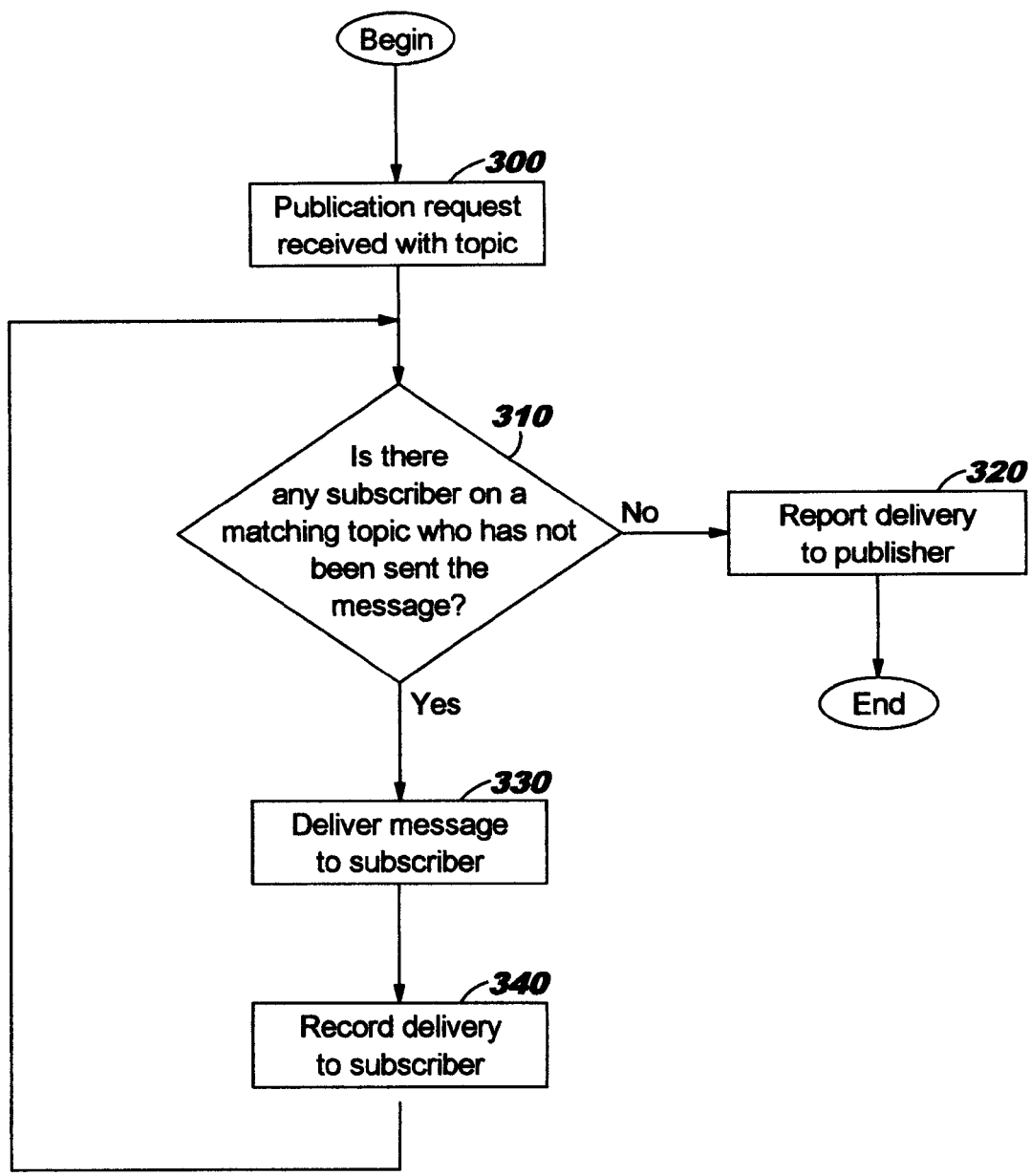
Figure 4:
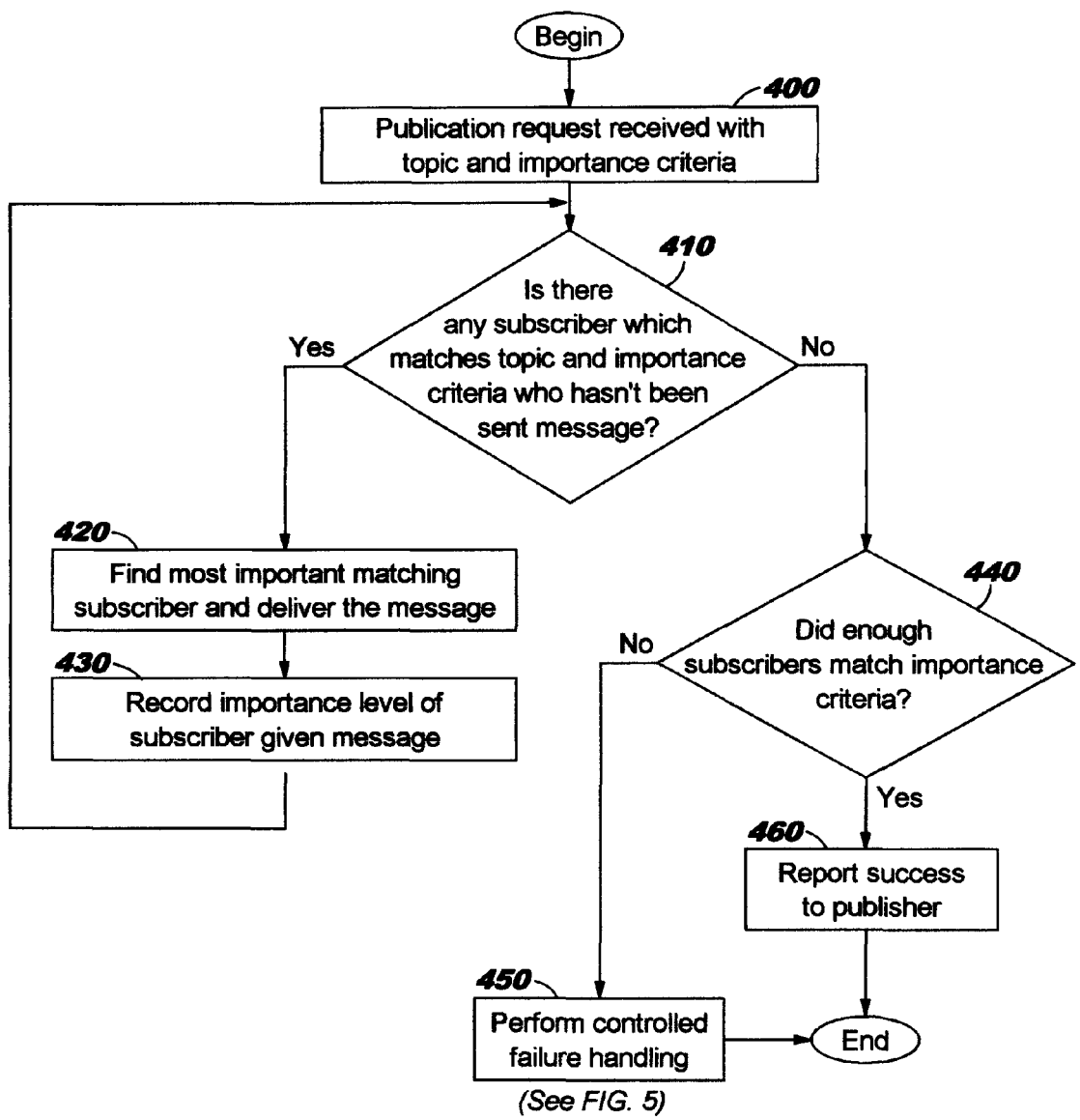

Each aspect of the present invention uses previously-registered subscription information. Referring now to FIG. 2, a flowchart is provided depicting logic which may be used when implementing a subscriber registration process. At Block 200, a subscription request from a subscriber is received at a message broker, where this subscription request includes a topic and an importance level. Optionally, an embodiment of the present invention provides for controlling whether particular subscribers are allowed to subscribe at particular importance levels, and this may vary depending on the topic of the subscription. For example, it may be useful to restrict the subscribers that are allowed to register at the highest importance level for a topic "employeeInfo/". Registration restrictions may be specified, for example, by a systems administrator who creates a configuration file that will be consulted during the subscriber registration process. Accordingly, Block 210 tests whether the subscriber sending the currently-processed subscription request is allowed to subscribe at the importance level specified in the subscription request. If not, then this subscription request is not honored, and processing returns to Block 200 to process a different subscription. (A notification or error message may be sent to the subscriber in this case, although this has not been illustrated in FIG. 2.) On the other hand, when this subscriber is allowed to subscribe at the requested importance level—and also in an embodiment where subscription registrations are not restricted—control transfers to Block 220, where this subscription is added to the collection of registered subscriptions. With reference to the components illustrated in FIG. 1, the processing of Block 220 comprises adding the subscription to a subscription registry 130.

An embodiment of the present invention allows publishers to receive a warning or failure notification if not enough "important" subscribers are registered for a message published by that publisher. In addition or instead, a warning or failure notification can be provided if there are not enough "important" subscribers for a particular portion of the topic space at which a message is published. These warning or failure notifications may be directed to a systems administrator in addition to, or instead of, to the publisher without deviating from the scope of the present invention.

An embodiment of the present invention may provide for publisher control over, and/or feedback from, the publishing of messages in a number of ways, as will now be discussed in more detail with reference to FIGS. 3-7.

In a first aspect, an information-only approach is provided, whereby a message broker provides feedback to the message publisher regarding message delivery. This aspect is illustrated by the processing in FIG. 3. As shown therein, a message publisher publishes a message with an associated topic (Block 300). The message broker consults the registered subscriptions to determine whether any subscriber that registered for this topic has not yet been sent the message (Block 310). If the test in Block 310 has a positive result, then processing continues at Block 330 where the message is delivered to the located subscriber. Block 340 then records information about this delivery, after which control returns to Block 310 to determine whether there are any more subscribers for this message. When the test at Block 310 has a negative result, indicating that there are no more subscribers for this message, processing continues at Block 320, where feedback regarding the message delivery is provided to the message publisher. (See FIG. 1, where this feedback to the publisher is depicted.)

In an alternative approach, which may be used with this aspect and/or with other aspects disclosed herein, in addition to—or instead of—publishing the feedback to the publisher, the feedback may be published to a third party, or published to a separate topic, or written to a different location (such as by writing a notification into a message log). This alternative approach may be used, for example, for enabling a separate application to monitor message publication in order to detect problems or patterns. This application might be configured to send a notification to an administrator, for example, upon detecting that not enough important subscribers were receiving message publications on a particular topic.

The information which is recorded at Block 340 may comprise, by way of example, an identifier of the subscriber and/or the importance level of that subscriber. The information provided as feedback to the publisher at Block 320 may comprise all of the information for each individual subscriber as recorded at Block 340. Alternatively, the publisher may receive feedback in another form, such as a count of subscribers, by importance level, based on the information recorded at Block 340.

In this and other aspects, the message publisher may use the feedback from the message broker to make an application-specific decision as to whether the message reached the required subscribers before taking further action. For example, if the publisher needs all of the subscribers at a particular importance level to receive a particular message before the publisher continues on to publish another message, the feedback from the message broker can be used to determine whether this condition is met, and the publisher can then publish the next message—or not—in view of the feedback. As another example, when message publishing is used within a transaction processing system, the publisher might need to determine whether a message reached all required subscribers before issuing a commit for a transaction, and if it did not, the publisher can roll back the transaction instead.

In a second aspect, an approach is provided that uses parameter-based criteria for message delivery. This aspect is illustrated by the processing in FIG. 4. A message publisher publishes a message with an associated topic and importance criteria (Block 400). In this aspect, the importance criteria are specified as one or more parameters, indicating how many subscribers at particular importance level(s) must receive the message in order to consider the publication a success. For example, if the importance criteria comprises two parameters of the form ("Importance Level>=5" AND "Minimum Number of Subscribers=2"), then at least 2 subscribers, each having an importance level of 5 or higher, must receive the message for the publication to be considered as successful.

The message broker consults the registered subscriptions to determine whether any subscriber registered for this topic and matching the importance level in the associated importance criteria has not yet been sent the message (Block 410). If the test in Block 410 has a positive result, then processing continues at Block 420. Optionally, an ordered delivery approach may be used, where a message is sent to subscribers registered at higher importance levels before the same message is sent to subscribers registered at lower importance levels. Accordingly, Block 420 indicates finding the most-important matching subscriber that has not yet been sent the message, and sending the message to that subscriber. Block 430 then records information about this delivery, after which control returns to Block 410 to determine whether there are any more matching subscribers for this message. Preferably, the information recorded at Block 430 comprises the importance level of the subscriber to which the message is sent at Block 420.

When the test at Block 410 has a negative result, indicating that there are no more matching subscribers for this message, processing continues at Block 440 for providing feedback regarding the message delivery to the message publisher. Block 440 tests whether the message was delivered to enough subscribers, of the appropriate importance level, to meet the requirements of the parameters specifying the importance criteria. If not, then Block 450 performs controlled failure handling to send a notification message to the publisher. This controlled failure handling comprises a fourth aspect, and is described below with reference to FIG. 5. (The notification message that will be sent to the publisher according to the processing of FIG. 5 varies, as discussed below.)

When the test in Block 440 has a positive result, indicating that the message was sent to enough subscribers, processing continues at Block 460 where feedback is provided to the publisher indicating that the message publication was successful.

In a third aspect, an approach is provided that uses rule-based criteria. This approach is similar to the parameter-based criteria approach, but specifies the importance criteria using one or more rules to indicate how many subscribers at particular importance level(s) must receive the message in order to consider the publication a success. Using rules may enable supporting more powerful and more complicated conditions as compared to the parameter-based approach. Rules may be specified using a syntax similar to the Structured Query Language (commonly known as "SQL") or using a regular expression syntax, by way of example. For example, a rule might be expressed in a form such as "(3 subscriptions>=Importance Level 5) OR (5 subscriptions>=Importance Level 2)". As a further example, in an implementation supporting a non-integer and non-importance-level approach for message classification, a scenario using free-text matching might specify the classification criteria using a rule to require "(at least 2 subscribers where subscriber.type="blue") AND (at least 1 subscriber where subscriber.type="red")".

Processing for the rule-based criteria approach is preferably analogous to that of the parameter-based criteria approach, with the exception of determining a match to the importance criteria using the rules instead of the parameters. Accordingly, the logic depicted in FIG. 4 may also be used when implementing the third aspect. A commercially-available rules engine may be leveraged for analyzing the rules and determining whether the importance level in a particular registered subscription meets the conditions specified in the rules.

In a fourth aspect, controlled failure handling is provided as additional functionality in the parameter-based criteria approach of the second aspect and/or the rule-based criteria approach of the third aspect. An implementation may be coded for a particular setting of the controlled failure handling. Alternatively, an implementation may enable a publisher or perhaps a systems administrator to specify the behavior that occurs when importance criteria are not met for a particular message. When the implementation is coded for a particular setting, this may comprise setting a WARN vs. FAIL switch, thus indicating whether processing should use a warn mode or a fail mode. When the publisher or administrator provides input for the controlled failure handling, this preferably comprises allowing the publisher or administrator to choose between warn mode and fail mode.

In a preferred embodiment of the controlled failure handling, it is presumed that messages are being delivered to subscribers in order of importance level. Accordingly, if warn mode is selected for the controlled failure handling, a message will be delivered to less-important subscribers even when the importance criteria are not met. For example, in the parameter-based criteria example discussed above with reference to the second aspect (i.e., where successful publication requires at least 2 subscribers with importance level>=5), if there is only 1 subscriber with importance level>=5, then the message is still published to that subscriber and to any other registered subscribers at lower importance levels. A warning message is provided as feedback to the message publisher. On the other hand, if fail mode is selected for the controlled failure handling, then a message would not be delivered to any further subscribers as soon as it is determined that the importance criteria are not met. (Refer to the discussion of FIG. 5 below, where this difference in processing between warn mode and fail mode is described in more detail.)

In a more complex implementation, the controlled failure handling may be fine-tuned according to specified rules. For example, a rule might be specified which has semantics of "If the message cannot be published to at least 2 subscribers having importance level 5, then warn the publisher, and if the message cannot be published to at least 2 subscribers having importance level 4, also notify the publisher of failure.".

Figure 5:
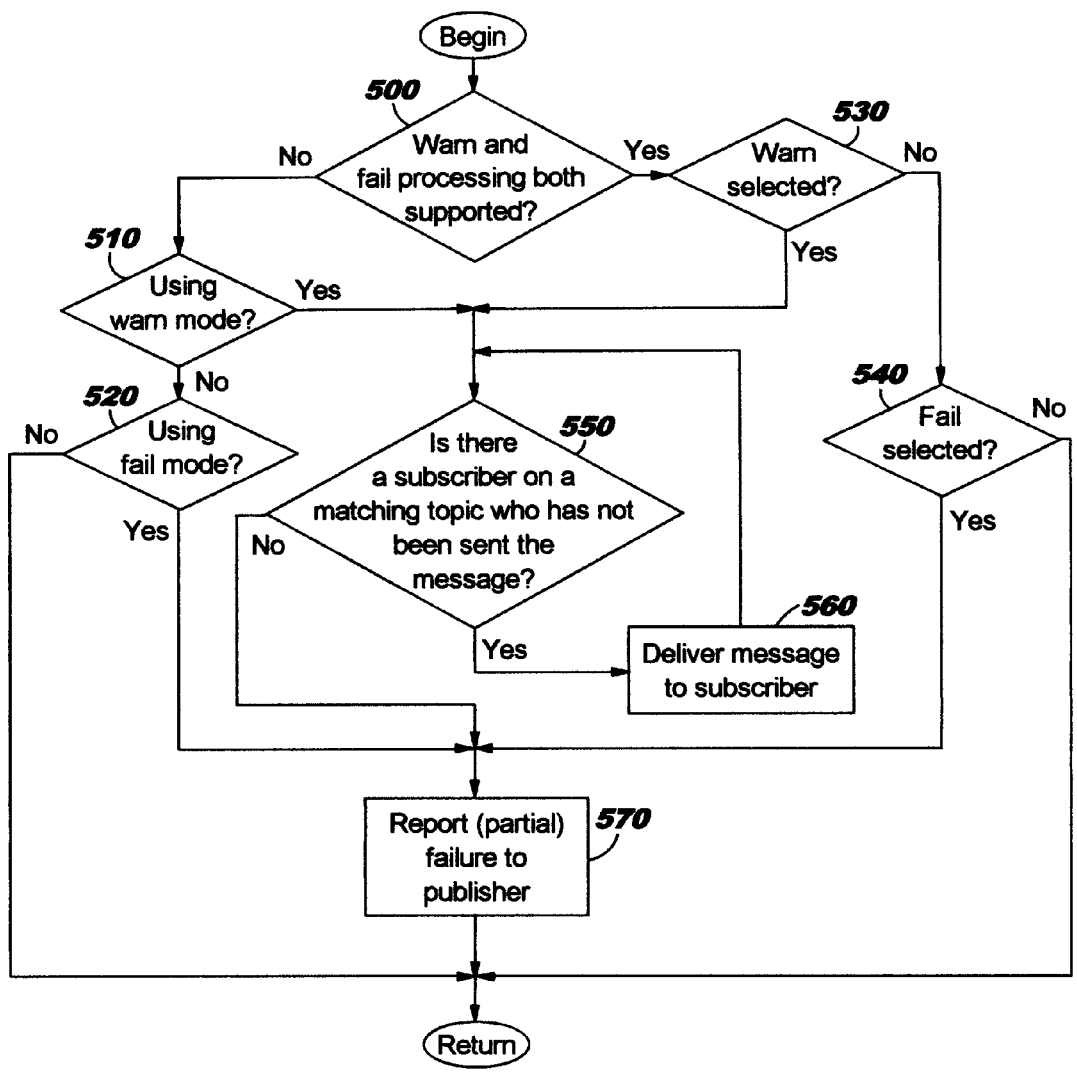

Referring now to FIG. 5, Block 500 tests whether the implementation supports both warn and fail processing. If so, then Block 530 tests whether warn processing has been selected (e.g., by the publisher or administrator). If warn processing has been selected, processing continues at Block 550, which tests whether any subscriber registered for this topic has not yet been sent the message. If the test in Block 550 has a positive result, then the message is sent to that subscriber at Block 560. Control then returns to Block 550 for iterative processing that enables sending the published message to all subscribers matching the topic. When the message has been sent to all of these subscribers, the test in Block 550 has a negative result, and processing then continues at Block 570 by sending a notification message to the publisher. This notification message preferably reports that the message publication failed, or at least partially failed (i.e., indicating that the message was sent to subscribers although the importance criteria were not met).

The warn mode processing of Blocks 550-570 is also reached following a negative result at Block 500 (i.e., the implementation does not support both warn and fail processing) and a positive result for the test in Block 510, where this positive result indicates that warn mode is selected even though the implementation does not support both warn and fail processing.

When the test in Block 530 has a negative result, indicating that the implementation supports both warn and fail processing but warn mode is not selected, processing reaches Block 540. Block 540 tests whether fail mode is selected. If this test has a negative result, then neither warn or fail mode is selected, and control preferably returns from FIG. 5 to the invoking logic. On the other hand, when the test in Block 540 has a positive result, then processing continues at Block 570 by sending a notification message to the publisher. This notification message preferably reports that the message publication failed, or at least partially failed (i.e., indicating that the message was sent to the subscribers having the appropriate importance level). Notably, in fail mode, the message is not sent to subscribers that do not have the appropriate importance level.

The fail mode processing of Block 570 is also reached following a positive result for the test in Block 520, where this positive result indicates that fail mode is selected even though the implementation does not support both warn and fail processing. If the test in Block 520 has a negative result, this indicates that neither warn or fail mode is selected, and control preferably returns from FIG. 5 to the invoking logic In a fifth aspect, an approach is provided for what may be referred to as "all-or-nothing" publication. This aspect may be provided as additional functionality in the parameter-based criteria approach and/or the rule-based criteria approach, where the implementation supports the above-discussed controlled failure handling for controlling the behavior that occurs when importance criteria are not met for a particular message. In a relatively simple implementation, this may be provided as an "on/off" parameter, where the system sets the parameter to "on" when all-or-nothing publication is desired and to "off" when such handling is not desired. In a more complex implementation, finer-grained control over all-or-nothing publication may be supported by the processing for the parameter-based approach or the rule-based approach to allow the publisher, or perhaps the systems administrator, to specify whether all-or-nothing publication handling should occur for a particular set of conditions. When all-or-nothing publication is in use, the importance criteria for a message must be met as a condition for publishing the message at all, and if the conditions are not met, then the message will not be sent to any subscribers; on the other hand, if the conditions are met, then all subscribers will receive the message.

Figure 6:
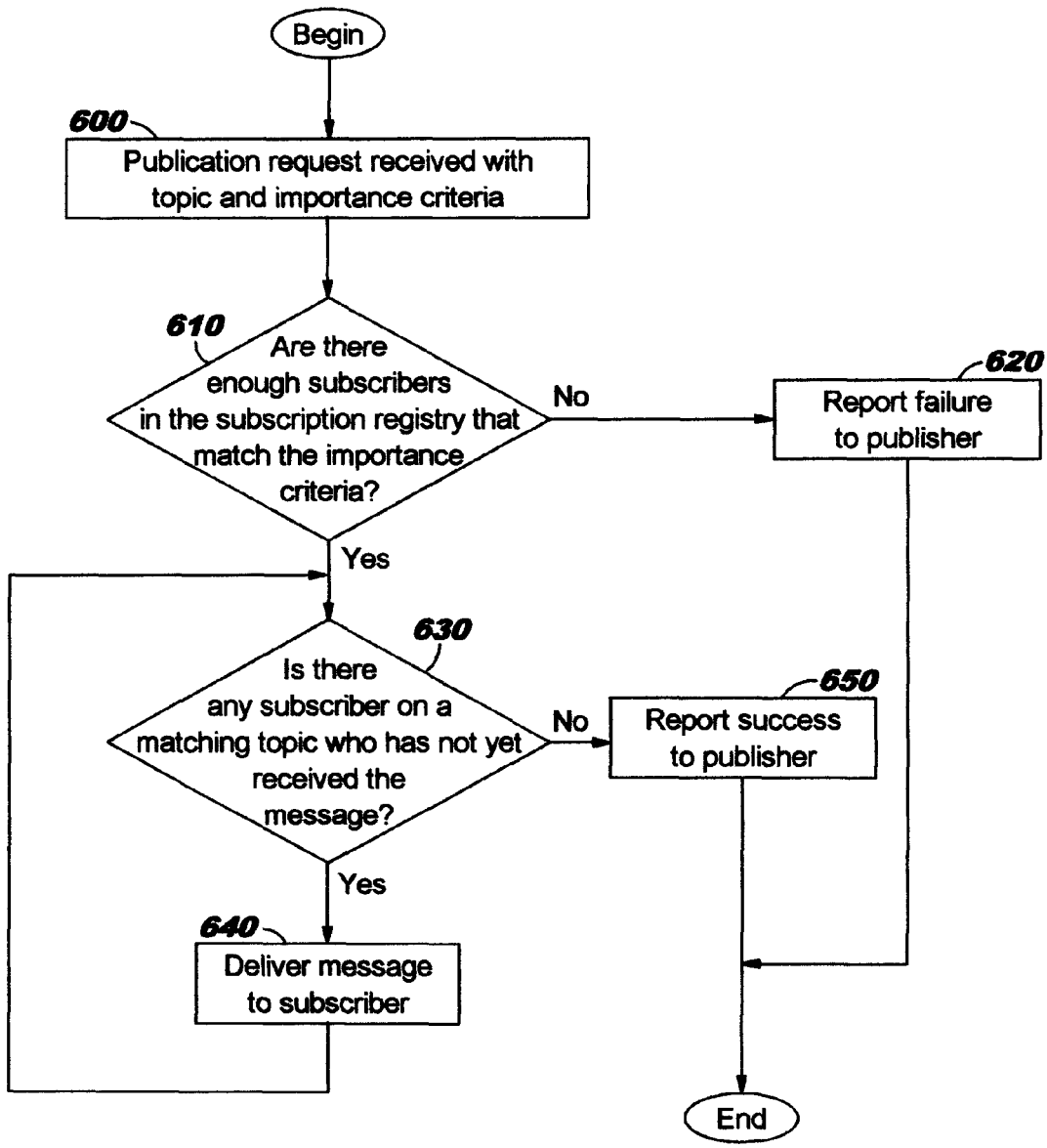
Figure 7:
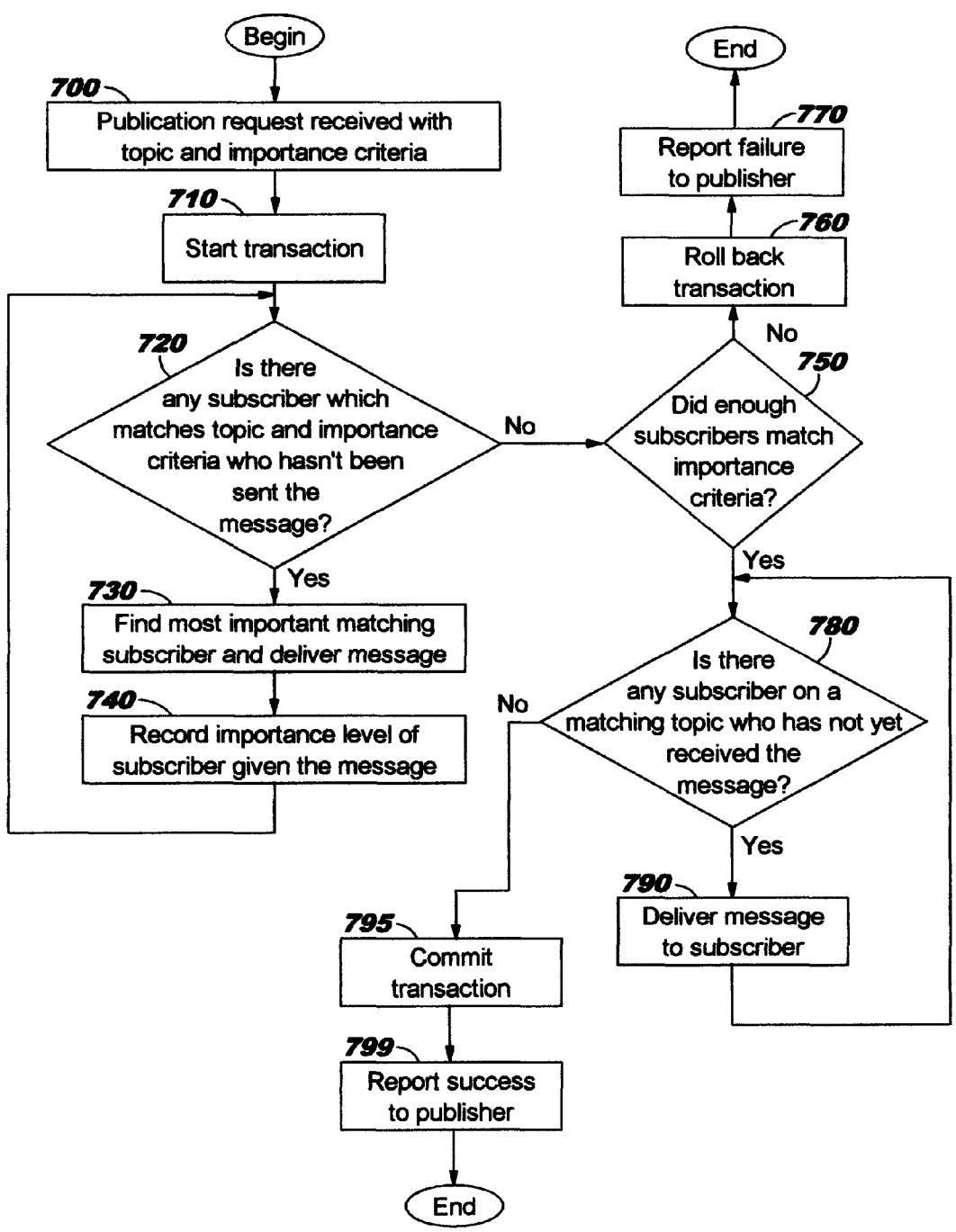

This fifth aspect is illustrated by the processing in FIG. 6. As shown therein, a message publisher publishes a message with an associated topic and importance criteria (Block 600). In this aspect, the message broker consults the registered subscriptions before sending the message to any subscriber. Accordingly, Block 610 indicates that the message broker consults the subscription registry to determine whether there are enough registered subscribers for this topic, of the appropriate importance level, to meet the requirements specified in the importance criteria associated with the message. If not, then Block 620 sends feedback to the publisher indicating that the publication failed. On the other hand, if the importance criteria are met by the registered subscribers, then control reaches Block 630 which begins an iterative process to send the message to all of the subscribers registered for this topic.

In particular, Block 630 determines whether any subscriber registered for this topic has not yet been sent the message. If the test in Block 630 has a positive result, then processing continues at Block 640 where the message is sent to that subscriber. Notably, the message is sent without regard to whether the importance level registered by this subscriber matches the importance criteria associated with the message. Control then returns to Block 630 to determine whether there are any more subscribers for this message.

When the test at Block 630 has a negative result, indicating that there are no more subscribers for this message, processing continues at Block 650, where feedback is sent to the publisher indicating that the message publication was successful.

Optionally, information (such as the importance level of the subscriber to which the message is sent) may be recorded about the delivery to the subscribers and subsequently provided with the feedback to the publisher at Block 650, although this information recording has not been depicted in FIG. 6.

As noted earlier, the importance level is not limited to use of integer values. Accordingly, a rule may be specified using syntax such as "(Importance Level="auditing" AND Importance Level="accounting")" to carry out the all-or-nothing publication scenario discussed earlier where a message must be delivered to both the auditing department and the accounting department, or the message must not be delivered at all. (When using non-integer values for importance levels, an ordering mechanism is preferably added for those aspects that use in-order message sending. For example, digits may be prepended to alphanumeric importance values, or a lookup table may be consulted that specifies relative importance levels of various alphanumeric importance values.)

All-or-nothing publication that sends each message on a particular topic to an auditing subscriber (e.g., an auditing department or auditing application) may be used as a mechanism for auditing message publication on that topic, whereby the auditing subscriber can use the received messages to create an audit trail. When using integers for importance levels, the auditing subscriber should be registered for this topic with a durable subscription at the highest importance level, and the importance criteria for messages published on that topic should require at least one subscriber having the highest importance level. (Durable subscriptions are discussed in more detail below.) Provided that an embodiment of the present invention uses the optional processing that allows for restricting which subscribers can register subscriptions at particular importance levels (as discussed earlier with reference to Block 210 of FIG. 2), subscribers other than the auditing subscriber can be prevented from registering subscriptions at the highest level. Accordingly, even if the auditing subscription is removed for any reason, the auditing subscriber is assured of receiving a complete copy of the published messages on the topic by specifying the importance criteria in the all-or-nothing publication approach to prevent all subscribers from receiving a published message when the highest-level auditing subscriber is not able to receive that message.

In a sixth aspect, the all-or-nothing approach is used in a transactional publishing model. That is, the publishing of the message is modelled as a transaction which can be committed or rolled back. In this sixth aspect, the message is sent to subscribers within the scope of a transaction, and then a check is made to determine whether the publication was successful according to the importance criteria. If so, then the transaction is committed and if not, the transaction is rolled back. This aspect is illustrated by the processing in FIG. 7. As shown therein, a publisher publishes a message with an associated topic and importance criteria (Block 700). A transaction is started (Block 710). The message broker consults the registered subscriptions to determine whether any subscriber registered for this topic and matching the importance level in the associated importance criteria has not yet been sent the message (Block 720). If the test in Block 720 has a positive result, then processing continues at Block 730. Optionally, an ordered delivery approach may be used, where a message is sent to subscribers registered at higher importance levels before the same message is sent to subscribers registered at lower importance levels. Accordingly, Block 730 indicates finding the most-important matching subscriber that has not yet been sent the message, and sending the message to that subscriber. Block 740 then records information about this delivery, after which control returns to Block 720 to determine whether there are any more matching subscribers for this message. Preferably, the information recorded at Block 740 comprises the importance level of the subscriber to which the message is sent at Block 730.

When the test at Block 720 has a negative result, indicating that there are no more matching subscribers for this message, processing continues at Block 750. Block 750 tests whether the message was sent to enough subscribers, of the appropriate importance level, to meet the importance criteria. If not, then Block 760 rolls back the transaction and Block 770 provides feedback to the publisher, indicating that the publication failed. On the other hand, when the importance criteria were met, the test in Block 750 has a positive result and processing continues at Block 780. Blocks 780 and 790 iterate through all remaining subscribers matching the topic of the message, with Block 780 testing whether another such subscriber registered for this topic has not yet been sent the message, and delivering the message to the subscriber at Block 790. When the test at Block 780 has a negative result, indicating that there are no more subscribers for this message, processing continues at Block 795, where the transaction is committed. Block 799 then provides feedback to the publisher, indicating that the message publication was successful.

It should be noted that when delivery of a message to a subscriber is considered complete may vary among messaging systems. For example, some—but not all—pub/sub messaging systems consider delivery to be complete when a message is placed onto a queue for a subscriber. Notably, placing the message onto a subscriber's queue does not mean that the subscribing application has actually received, or processed, the message. When using a transactional publishing model, a subscribing application cannot read a published message from its message queue prior to the commit or rollback of the transaction. Committing the transaction enables the subscriber to read the message, whereas rolling back the transaction ensures that the subscriber will never see the message. Implementations of the present invention are not limited to a particular interpretation of delivery completeness.

Figure 8:
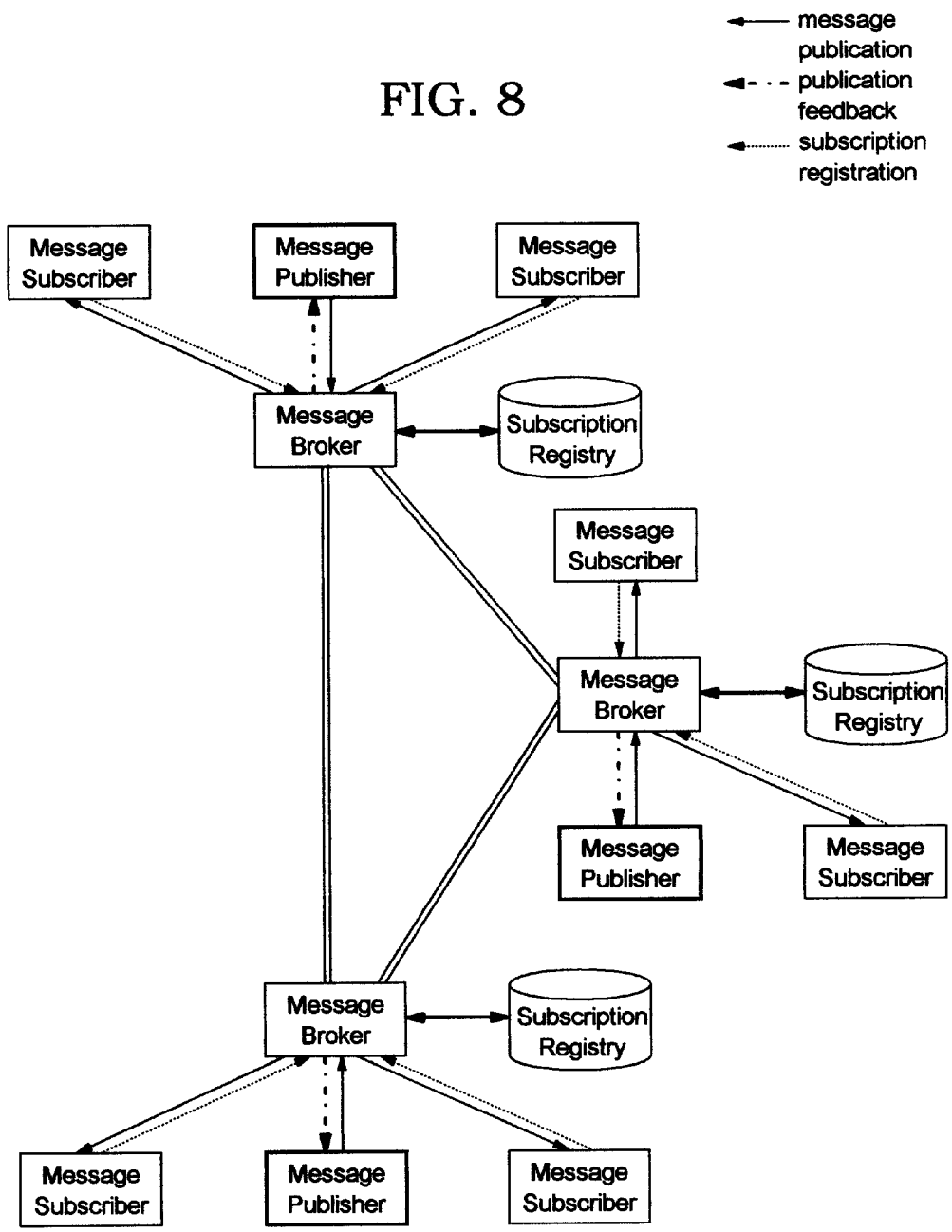
FIG. 8 illustrates components which may be used with an embodiment of the present invention in a pub/sub cluster environment.

In some pub/sub messaging environments, a pub/sub cluster approach is used whereby multiple message brokers are connected together. An embodiment of the present invention may be used in such clustered environments, and subscribers which are reachable through each of the message brokers may then be considered when determining whether the importance criteria for a particular message are met. Components which may be used when implementing an embodiment of the present invention in this pub/sub cluster approach are illustrated in FIG. 8. In this example, 3 message brokers are interconnected; each message broker is shown as having its own subscription registry; a single message publisher is shown (for ease of illustration only) as publishing messages to each of the message brokers; and two message subscribers (by way of example) are shown as being reachable from each of the message brokers.

In a pub/sub cluster environment, when it is desired to provide all-or-nothing publishing according to the fifth aspect described above, an embodiment of the present invention is preferably adapted from the logic depicted in FIG. 6 to implement a multi-phase publish between the message brokers. In this multi-phase publish, the message broker connected to the publisher notifies the other message brokers of the topic and importance criteria of the message. The notified message brokers consult their subscription registries to determine which of their registered subscribers for this topic meet the importance criteria for this message, and then report this information back to the notifying message broker. The notifying message broker then consolidates the information from the other message brokers, along with information on its own matching subscribers, to determine whether the importance criteria are met by the collection of message subscribers. If so, then the notifying message broker notifies the other message brokers, and each message broker (including the notifying message broker as well as the notified message brokers) forwards the message to all registered subscribers for this topic. If the importance criteria are not met, when considering the responses from all of the message brokers, then the message is not published to any of the registered subscribers. The notifying message broker is responsible for providing feedback to the message publisher as to whether the publication was successful.

As an alternative, the transactional publishing model according to the sixth aspect described above may be used in a pub/sub cluster environment. In this alternative, an embodiment of the present invention is preferably adapted from the logic depicted in FIG. 7 to implement a multi-phase publish between the message brokers using a transactional publish model. In this transactional multi-phase publish, the message broker connected to the publisher starts a transaction and then notifies the other message brokers of the topic and importance criteria of the message. The notified message brokers start a cascaded transaction and then iteratively consult their subscription registries to locate a registered subscriber for this topic that meets the importance criteria for this message. The message is sent to the matching subscriber, preferably in an order from highest importance to lowest importance, and the importance level of the subscriber is recorded. When the message has been sent to each subscriber that registered the appropriate importance level for the topic, the message broker determines how many subscribers met the importance criteria. The notified brokers return this information back to the notifying message broker. The notifying message broker then consolidates the information from the other message brokers, along with information on its own matching subscribers, to determine whether the importance criteria are met by the collection of message subscribers. If so, then the notifying message broker notifies the other message brokers that their cascaded transactions can be committed, and the notifying message broker also commits its transaction. If the importance criteria are not met, when considering the responses from all of the message brokers, then the notifying message broker notifies the other message brokers that their cascaded transactions must be rolled back, and the notifying message broker also rolls back its transaction. The notifying message broker is responsible for providing feedback to the message publisher as to whether the publication was successful.

It may happen, when using the transactional publishing model in a pub/sub cluster environment, that a relatively long amount of time passes before the message brokers all complete their processing. It may therefore be advantageous to use an asynchronous messaging approach whereby the publisher decouples its processing of the message publication from its processing of the feedback.

Some pub/sub messaging systems provide what is termed "retained" messages. A retained message, in this context, is a message that will be kept by a message broker after it is initially sent to registered subscribers. Typically, a retained message is marked by the publisher as a retained message when published. If a new subscription is registered for that message topic, the retained message can be sent to this subsequently-registered subscriber even though the subscription did not exist when the message was originally published. Retained messages may be supported by embodiments of the present invention. In one approach, if the original publication of a message marked as a retained message is successful according to the importance criteria, that message remains available for sending to subsequently-registering subscribers (for example, upon request of such a subscriber). In aspects where subscribers receive published messages even though the importance criteria were not met (e.g., when warn mode is selected), then the retained message is preferably sent to subsequently-registering subscribers; in other aspects, the retained message is not available to subsequently-registering subscribers. For the information-only approach of the first aspect, the feedback provided to the message publisher preferably includes results from publishing retained messages to subsequently-registering subscribers if that feedback has not yet been delivered (or remains available for asynchronous access). In some scenarios, it may be desirable to delay the determination of whether a particular message publication completed successfully until subscribers (or some number thereof) receive retained messages. It will be obvious to one of ordinary skill in the art, in view of the disclosure provided herein, how the processing of the various aspects may be modified to accommodate such delayed determination if desired for a particular implementation.

Some pub/sub messaging systems support what are termed "durable" subscriptions. A durable subscription, in this context, is a registered subscription that remains active even while the subscriber is disconnected from the pub/sub messaging system. Upon reconnecting, the subscriber will receive messages that were published to topics matching the durable subscription during the period of the disconnect. By contrast, non-durable subscriptions are removed when the subscriber disconnects, and subscribers do not receive messages published to topics matching non-durable subscriptions during the period of the disconnect. Durable subscriptions may be supported by embodiments of the present invention. In one approach, if the original publication of a message published to a topic matching a durable subscription is successful according to the importance criteria, that message is preferably sent to later-connecting subscribers with a previously-registered durable subscription to that topic (for example, upon request of such a subscriber). In aspects where subscribers receive published messages even though the importance criteria were not met (e.g., when warn mode is selected), then a previously-published message is preferably sent to later-connecting subscribers with a previously-registered durable subscription to that topic; in other aspects, the previously-published message is not sent to later-connecting subscribers with a previously-registered durable subscription to that topic. For the information-only approach of the first aspect, the feedback provided to the message publisher preferably includes results from sending a previously-published message to these later-connecting subscribers if that feedback has not yet been delivered (or remains available for asynchronous access). In some scenarios, it may be desirable to delay the determination of whether a particular message publication completed successfully until these later-connecting subscribers (or some number thereof) receive previously-published messages. It will be obvious to one of ordinary skill in the art, in view of the disclosure provided herein, how the processing of the various aspects may be modified to accommodate such delayed determination if desired for a particular implementation.

Figure 9:
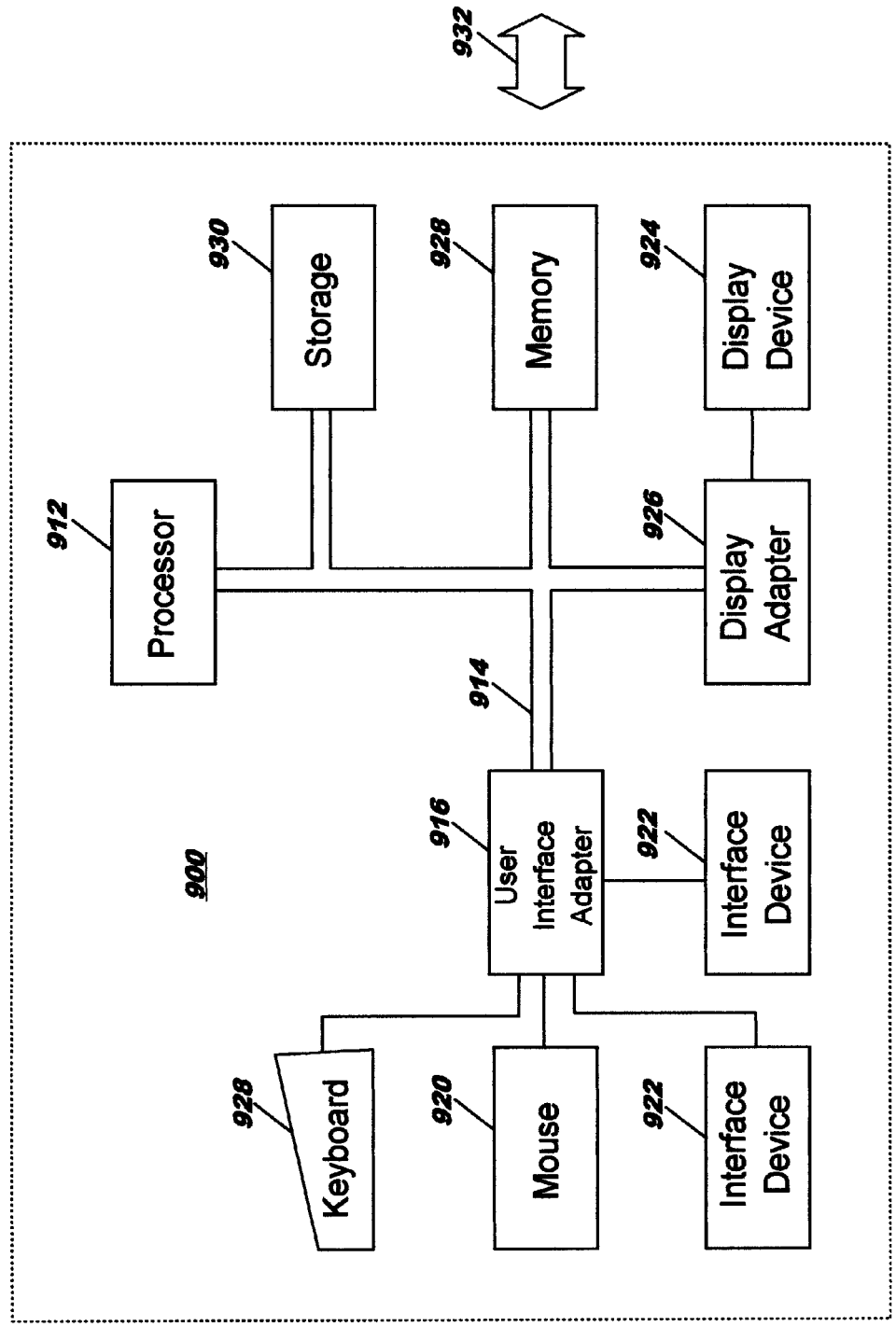
FIG. 9 depicts a data processing system suitable for storing and/or executing program code.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output ("I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

Figure 10:
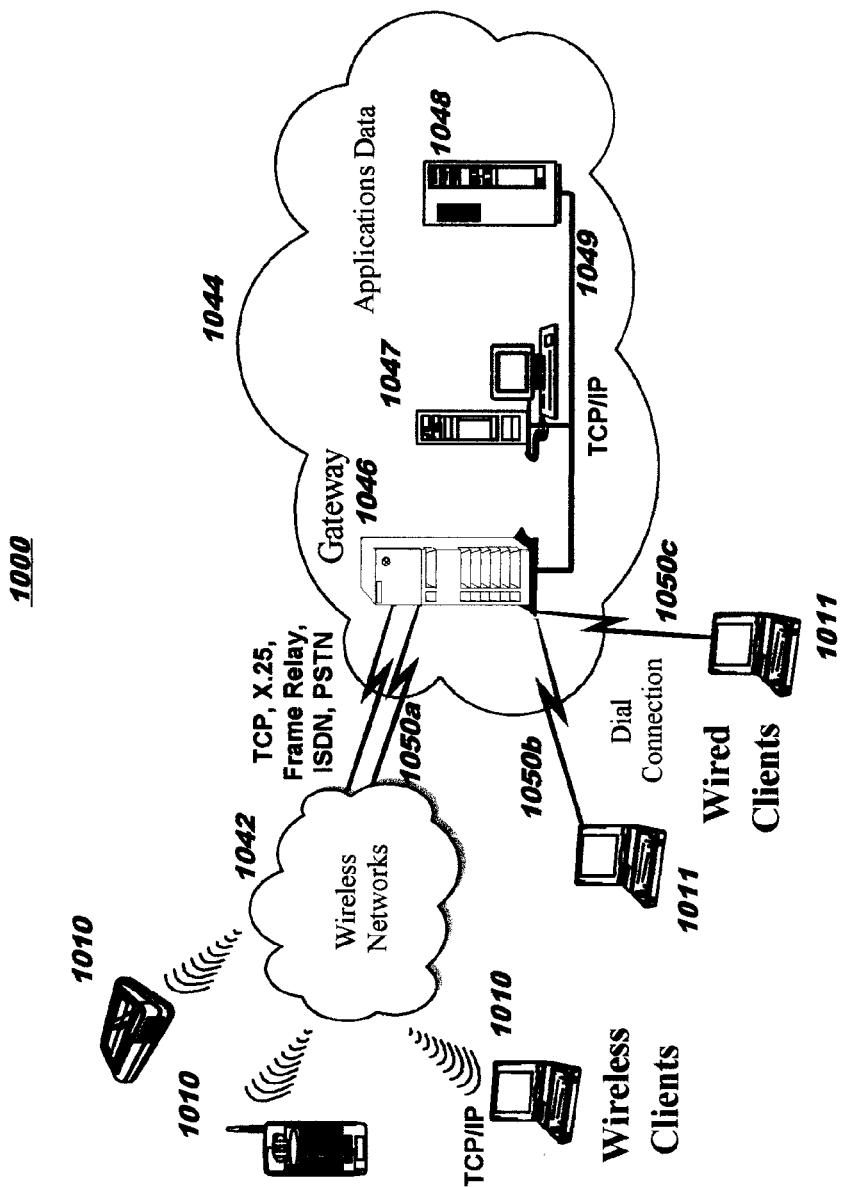
FIG. 10 depicts a representative networking environment in which one or more embodiments of the present invention may be used.

FIG. 10 illustrates a data processing network environment 1000 in which the present invention may be practiced. The data processing network 1000 may include a plurality of individual networks, such as wireless network 1042 and wired network 1044. A plurality of wireless devices 1010 may communicate over wireless network 1042, and a plurality of wired devices, shown in the figure (by way of illustration) as workstations 1011, may communicate over network 1044. Additionally, as those skilled in the art will appreciate, one or more local area networks ("LANs") may be included (not shown), where a LAN may comprise a plurality of devices coupled to a host processor.

Still referring to FIG. 10, the networks 1042 and 1044 may also include mainframe computers or servers, such as a gateway computer 1046 or application server 1047 (which may access a data repository 1048). A gateway computer 1046 serves as a point of entry into each network, such as network 1044. The gateway 1046 may be preferably coupled to another network 1042 by means of a communications link 1050a. The gateway 1046 may also be directly coupled to one or more workstations 1011 using a communications link 1050b, 1050c, and/or may be indirectly coupled to such devices. The gateway computer 1046 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 1046 may also be coupled 1049 to a storage device (such as data repository 1048).

Those skilled in the art will appreciate that the gateway computer 1046 may be located a great geographic distance from the network 1042, and similarly, the workstations 1011 may be located some distance from the networks 1042 and 1044, respectively. For example, the network 1042 may be located in California, while the gateway 1046 may be located in Texas, and one or more of the workstations 1011 may be located in Florida. The workstations 1011 may connect to the wireless network 1042 using a networking protocol such as the Transmission Control Protocol/Internet Protocol ("TCP/IP") over a number of alternative connection media, such as cellular phone, radio frequency networks, satellite networks, etc. The wireless network 1042 preferably connects to the gateway 1046 using a network connection 1050a such as TCP or User Datagram Protocol ("UDP") over IP, X.25, Frame Relay, Integrated Services Digital Network ("ISDN"), Public Switched Telephone Network ("PSTN"), etc. The workstations 1011 may connect directly to the gateway 1046 using dial connections 1050b or 1050c. Further, the wireless network 1042 and network 1044 may connect to one or more other networks (not shown), in an analogous manner to that depicted in FIG. 10.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of message publication feedback in a publish/subscribe messaging environment, comprising:

receiving, at a message broker, a message published by a message publisher, the message having associated therewith a topic;

selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message;

sending the published message from the message broker to each of the at least one selected subscriber;

subsequently sending the published message to at least one of the plurality of registered message subscribers which is a durable subscriber, the durable subscriber characterized by being disconnected during the sending of the published message from the message broker to each of the at least one selected subscriber, yet retaining an active registered subscription for which the registered topic matches the topic associated with the published message; and sending, from the message broker to the message publisher, feedback regarding the sending of the published message, wherein:

the feedback reflects the sending and the subsequent sending; and the feedback is delayed, following the sending of the published message to each of the at least one selected subscriber, to await the subsequent sending of the published message to the at least one durable subscriber.

2. The method according to claim 1, wherein the feedback comprises, for each of the at least one selected subscriber, a subscriber identifier that identifies the subscriber.

3. The method according to claim 1, wherein the feedback comprises, for each of the at least one selected subscriber, the importance level specified in the registered subscription of the subscriber.

4. The method according to claim 1, wherein the feedback comprises a count of the at least one selected subscriber to which the published message is sent.

5. The method according to claim 1, wherein the feedback comprises a count, by importance level, of the at least one selected subscriber to which the published message is sent.

6. The method according to claim 1, further comprising:

responsive to determining, by the message broker, that the published message is to be a retained message, retaining the published message subsequent to sending the published message to each of the at least one selected subscriber;

responsive to detecting, by the message broker, a new message subscriber that registers a subscription for which the registered topic matches the topic associated with the retained message, subsequently sending the retained message to the new subscriber; and reflecting the subsequent sending of the published message in the feedback sent from the message broker to the message publisher.

7. The method according to claim 6, wherein the feedback sent from the message broker to the message publisher is delayed, following the sending of the published message to each of the at least one selected subscriber, to await the subsequent sending of the retained message to the new subscriber.

8. The method according to claim 1, further comprising:

forwarding the published message, by the message broker, to each of at least one additional message broker to which the message broker is communicably coupled in a cluster environment, each additional message broker having a plurality of registered message subscribers that have registered subscriptions therewith to receive published messages, each registered subscription specifying a topic and an importance level for receiving published messages having the registered topic associated therewith;

receiving, at the message broker from each of the at least one additional message brokers, feedback regarding sending of the forwarded message by the additional message broker to selected ones of the subscribers registered therewith responsive to the registered topic matching the topic associated with the forwarded message; and consolidating the feedback received from each of the at least one additional message brokers with the feedback regarding the sending of the published message; and wherein the feedback sent to the message publisher comprises the consolidated feedback.

9. A system for message publication feedback in a publish/subscribe messaging environment, comprising:

a computer comprising a processor; and instructions which are executable, using the processor, to implement functions comprising:

receiving, at a message broker, a message published by a message publisher, the message having associated therewith a topic;

selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message;

sending the published message from the message broker to each of the at least one selected subscriber;

forwarding the published message, by the message broker, to each of at least one additional message broker to which the message broker is communicably coupled in a cluster environment, each additional message broker having a plurality of registered message subscribers that have registered subscriptions therewith to receive published messages, each registered subscription specifying a topic and an importance level for receiving published messages having the registered topic associated therewith;

receiving, at the message broker from each of the at least one additional message brokers, feedback regarding sending of the forwarded message by the additional message broker to selected ones of the subscribers registered therewith responsive to the registered topic matching the topic associated with the forwarded message; and consolidating the feedback received from each of the at least one additional message brokers with feedback regarding the sending of the published message from the message broker to the each of the at least one selected subscriber; and sending, from the message broker to the message publisher, the consolidated feedback.

10. The system according to claim 9, wherein the feedback regarding the sending of the published message from the message broker to the each of the at least one selected subscriber comprises, for each of the at least one selected subscriber, a subscriber identifier that identifies the subscriber and the importance level specified in the registered subscription of the subscriber.

11. The system according to claim 9, wherein the feedback regarding the sending of the published message from the message broker to the each of the at least one selected subscriber comprises a count of the at least one selected subscriber to which the published message is sent.

12. The system according to claim 9, wherein the feedback regarding the sending of the published message from the message broker to the each of the at least one selected subscriber comprises a count, by importance level, of the at least one selected subscriber to which the published message is sent.

13. A computer program product for message publication feedback in a publish/subscribe messaging environment, the computer program product comprising:
a computer readable storage medium having computer readable program code embodied therein, the computer readable program code configured for:
receiving, at a message broker, a message published by a message publisher, the message having associated therewith a topic;
selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message;
sending the published message from the message broker to each of the at least one selected subscriber;
sending, from the message broker to the message publisher, feedback regarding the sending of the published message;
responsive to determining, by the message broker, that the published message is to be a retained message, retaining the published message subsequent to sending the published message to each of the at least one selected subscriber;
responsive to detecting, by the message broker, a new message subscriber that registers a subscription for which the registered topic matches the topic associated with the retained message, subsequently sending the retained message to the new subscriber; and
reflecting the subsequent sending of the published message in the feedback sent from the message broker to the message publisher.

14. The computer program product according to claim 13, wherein the importance level is an integer value.

15. The computer program product according to claim 13, wherein the importance level is a non-integer value.

16. The computer program product according to claim 13, the computer readable program code further configured for:
subsequently sending the published message to at least one of the plurality of registered message subscribers which is a durable subscriber, the durable subscriber characterized by being disconnected during the sending of the published message from the message broker to each of the at least one selected subscriber, yet retaining an active registered subscription for which the registered topic matches the topic associated with the published message; and
reflecting the subsequent sending of the published message to the at least one durable subscriber in the feedback sent from the message broker to the message publisher.

17. A computer-implemented method of message publication feedback in a publish/subscribe messaging environment, comprising:
receiving, at a message broker, a message published by a message publisher, the message having associated therewith a topic;
selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message;
sending the published message from the message broker to each of the at least one selected subscriber;
sending, from the message broker to the message publisher, feedback regarding the sending of the published message;
responsive to determining, by the message broker, that the published message is to be a retained message, retaining the published message subsequent to sending the published message to each of the at least one selected subscriber;
responsive to detecting, by the message broker, a new message subscriber that registers a subscription for which the registered topic matches the topic associated with the retained message, subsequently sending the retained message to the new subscriber; and
reflecting the subsequent sending of the published message in the feedback sent from the message broker to the message publisher.

18. A computer-implemented method of message publication feedback in a publish/subscribe messaging environment, comprising:
receiving, at a message broker, a message published by a message publisher, the message having associated therewith a topic;
selecting, by the message broker from a plurality of registered message subscribers that have registered subscriptions with the message broker to receive published messages, each subscription specifying a topic and an importance level for receiving published messages having the registered topic associated therewith, at least one subscriber for which the registered topic matches the topic associated with the published message;
sending the published message from the message broker to each of the at least one selected subscriber;
sending, from the message broker to the message publisher, feedback regarding the sending of the published message;
forwarding the published message, by the message broker, to each of at least one additional message broker to which the message broker is communicably coupled in a cluster environment, each additional message broker having a plurality of registered message subscribers that have registered subscriptions therewith to receive published messages, each registered subscription specifying a topic and an importance level for receiving published messages having the registered topic associated therewith;
receiving, at the message broker from each of the at least one additional message brokers, feedback regarding sending of the forwarded message by the additional message broker to selected ones of the subscribers registered therewith responsive to the registered topic matching the topic associated with the forwarded message; and
consolidating the feedback received from each of the at least one additional message brokers with the feedback regarding the sending of the published message,
wherein the feedback sent to the message publisher comprises the consolidated feedback.

* * * * *